US009051882B2

United States Patent
Copeland et al.

(10) Patent No.: US 9,051,882 B2
(45) Date of Patent: Jun. 9, 2015

(54) SEALS FOR A GAS TURBINE ENGINE

(71) Applicant: Rolls-Royce Corporation, Indianapolis, IN (US)

(72) Inventors: Andrew D. Copeland, Greenwood, IN (US); John H. Munson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 14/137,147

(22) Filed: Dec. 20, 2013

(65) Prior Publication Data
US 2014/0265145 A1    Sep. 18, 2014

Related U.S. Application Data

(60) Provisional application No. 61/802,134, filed on Mar. 15, 2013.

(51) Int. Cl.
| F16J 15/34 | (2006.01) |
| F02C 7/28 | (2006.01) |
| F01D 11/00 | (2006.01) |
| F01D 25/18 | (2006.01) |
| F16J 15/44 | (2006.01) |

(52) U.S. Cl.
CPC .............. F02C 7/28 (2013.01); F01D 11/003 (2013.01); F01D 25/183 (2013.01); F16J 15/441 (2013.01); F05D 2260/95 (2013.01); F05D 2300/611 (2013.01); F16J 15/3496 (2013.01); F16J 15/443 (2013.01)

(58) Field of Classification Search
CPC ........ F16J 15/34; F16J 15/3496; F16J 15/344
USPC .......................... 277/358, 404, 405, 406, 407
See application file for complete search history.

(56) References Cited

U.S. PATENT DOCUMENTS

| 2,518,253 | A | * | 8/1950 | Reis ............................. 427/226 |
| 3,601,413 | A | | 8/1971 | Darnell |
| 3,604,523 | A | | 9/1971 | Lichte |
| 3,774,397 | A | | 11/1973 | Engdahl |
| 4,226,429 | A | | 10/1980 | Sato et al. |
| 4,299,398 | A | | 11/1981 | Wahl |
| 4,621,017 | A | | 11/1986 | Chandler et al. |
| 5,105,762 | A | | 4/1992 | Wilkinson |
| 6,358,565 | B1 | | 3/2002 | Krenkel et al. |

(Continued)

FOREIGN PATENT DOCUMENTS

| DE | 2951260 A1 | 7/1981 |
| DE | 102004041439 A1 | 3/2006 |

(Continued)

OTHER PUBLICATIONS

"Sealing Sense," Fluid Sealing Association Apr. 2009, pp. 74-76.

(Continued)

*Primary Examiner* — Gilbert Lee
(74) *Attorney, Agent, or Firm* — Barnes & Thornburg LLP

(57) ABSTRACT

A seal assembly for use in a gas turbine engine includes a first component, a second component, and a sealing unit. The first component is spaced apart from the second component to form a gap therebetween. The sealing unit is positioned in the gap between the first and second components to block liquids and/or gasses from traveling through the gap.

20 Claims, 4 Drawing Sheets

(56) References Cited

U.S. PATENT DOCUMENTS

| | | |
|---|---|---|
| 6,528,168 B1 | 3/2003 | Matsumoto et al. |
| 6,777,076 B2 | 8/2004 | Thaler et al. |
| 6,845,985 B2 | 1/2005 | Kraus |
| 2007/0194536 A1* | 8/2007 | Nobrega .................. 277/378 |
| 2010/0225067 A1 | 9/2010 | Bailey |
| 2011/0049809 A1 | 3/2011 | Garrison |
| 2012/0049461 A1 | 3/2012 | Deo et al. |
| 2012/0211944 A1 | 8/2012 | Nishimoto et al. |
| 2013/0241153 A1 | 9/2013 | Garrison |

FOREIGN PATENT DOCUMENTS

| | | |
|---|---|---|
| EP | 1507106 A1 | 2/2005 |
| EP | 2128524 A1 | 12/2009 |

OTHER PUBLICATIONS

International Search Report for PCT International Application Serial No. PCT/US2013/077105, dated Mar. 24, 2014, (13 pages).

* cited by examiner

SEALS FOR A GAS TURBINE ENGINE

CROSS REFERENCE TO RELATED APPLICATIONS

This application claims priority under 35 U.S.C. §119(e) to U.S. Provisional Application Ser. No. 61/802,134, filed Mar. 15, 2013, which is expressly incorporated by reference herein

FIELD OF THE DISCLOSURE

The present disclosure relates generally to mechanical seals, and more specifically, the present disclosure relates to mechanical seals used in gas turbine engines.

BACKGROUND

Gas turbine engines are used to power aircraft, watercraft, power generators, and the like. Gas turbine engines may include stationary components and rotating components. Stationary and rotating components in a gas turbine engine are often separated by a small gap. The small gap allows for variations in manufacturing tolerance of the adjacent components and for expansion/contraction of the components that occurs during operation of the gas turbine engine. The small gap may allow liquids and/or gasses to move between chambers of the gas turbine engine that are separated by the stationary and rotating components.

A seal may be positioned in the small gap between the stationary and rotating components to prevent the leakage of the liquids and/or gasses through the gap during operation of the gas turbine engine. The seal is sometimes made of graphitic carbon. Oxidation may occur in portions of the seal that are exposed to an oxygen containing environment, such as those portions not engaged with the rotating component. If oxidation occurs, the maintenance costs of operating the gas turbine engine may increase.

SUMMARY

The present application discloses one or more of the features recited in the appended claims and/or the following features which, alone or in any combination, may comprise patentable subject matter.

According to an aspect of the present disclosure, a seal assembly for use in a gas turbine engine may include a first component, a second component, and a sealing unit. The first and second components may cooperate to define a wet environment exposed to liquids and a dry environment not exposed to liquids. The first component may be positioned relative to the second component to define a gap therebetween. The sealing unit may be arranged in the gap between the first and second components to block liquid in the wet environment from traveling through the gap and entering the dry environment.

In some embodiments, the first surface may be an outer-circumferential surface and the second surface may be an inner-circumferential surface spaced apart from the outer-circumferential surface. The body may further include a first axial surface extending between the inner-circumferential surface and the outer-circumferential surface and a second axial surface spaced apart from the first axial surface and extending between the inner-circumferential surface and the outer-circumferential surface. A portion of the inner-circumferential surface of the sealing unit may be free from the coating and engage the rotating engine component to form a circumferential seal.

In some embodiments, the first axial surface of the sealing unit engages with a surface of the stationary engine component to form a face seal.

In some embodiments, the second axial surface may be formed to include an aperture opening into a space formed in the body, the space being defined by a first inner surface, and the coating is applied to the first inner surface.

In some embodiments, the outer-circumferential surface may be formed to include an aperture opening into a space formed in the body, the space being defined by a second inner surface, and the coating is coupled to the second inner surface.

In some embodiments, the inner-circumferential surface may be formed to include an aperture opening into a space formed in the body, the space being defined by a third inner surface, and the coating is coupled to the third inner surface.

In some embodiments, the first surface may be a first axial surface and the second surface may be a second axial surface spaced apart from the first axial surface. The body may further include an outer-circumferential surface extending between the first and second axial surfaces and an inner-circumferential surface extending between the first and second axial surfaces. A portion of the second axial surface of the sealing unit may be free from the coating and engage the rotating engine component to form a face seal.

In some embodiments, the sealing unit may further include a third axial surface positioned to lie between the first axial surface and the second axial surface. An intermediate-circumferential surface may be positioned between the inner-circumferential surface and the outer-circumferential surface and extends between the second axial surface and the third axial surface. The outer-circumferential surface may extend between the first axial surface and the third axial surface. The second axial surface may be uncoated and engage the rotating engine component, and the coating may be applied to the third axial surface and intermediate-circumferential surface.

In some embodiments, the sealing unit may further include an intermediate-circumferential surface positioned between the inner-circumferential surface and the outer-circumferential surface, a third axial surface positioned between the first axial surface and the second axial radially surface extending between the intermediate-circumferential surface and the outer-circumferential surface, and a fourth axial surface positioned between the first axial surface and the third axial surface radially extending between the intermediate-circumferential surface and the outer-circumferential surface. The coating may be coupled to the third axial surface, the fourth axial surface, and the intermediate-circumferential surface.

In some embodiments, the outer-circumferential surface may engage with a surface of the stationary engine component to form a circumferential seal.

In some embodiments, the coating may be less than or equal to about 0.001 inches in thickness.

In some embodiments, the coating may be formed from an oxidation resistant material.

In some embodiments, the coating may be formed from a ceramic material.

In some embodiments, the coating may be formed from silicon carbide (SiC).

In some embodiments, the coating may be applied by chemical vapor deposition.

In some embodiments, the body may be formed from carbon.

In some embodiments, the body may be formed from graphitic carbon.

In some embodiments, the coating does not penetrate into the body.

According to another aspect of the present disclosure, a method of forming a turbine engine component may include the steps of forming a sealing unit body, depositing a coating on the sealing unit body, and removing a portion of the coating from the sealing unit body. The sealing unit body may be formed from graphitic carbon. The coating may be formed from silicon carbide.

In some embodiments, the portion of the coating removed from a surface of the sealing unit body may be configured to engage a rotating engine component to form a mechanical seal.

In some embodiments, the method may further include processing at least a second portion of the coating to define a surface flatness and a surface thickness of the second portion of the coating.

In some embodiments, forming a sealing unit body from graphitic carbon may include forming a body mass from graphitic carbon and processing the body mass so the sealing unit body is within a dimensional tolerance.

In some embodiments, the sealing unit body may be within the dimensional tolerance after the coating is deposited on the sealing body.

These and other features of the present disclosure will become more apparent from the following description of the illustrative embodiments.

DETAILED DESCRIPTION OF THE DRAWINGS

Figure 1:
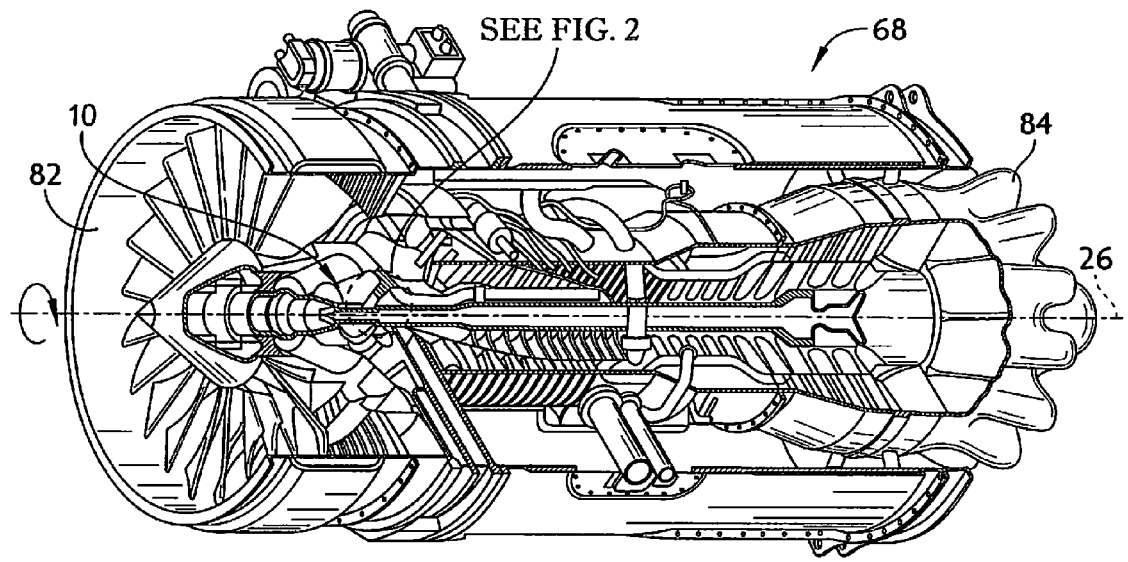
FIG. 1 is a partial perspective view of a gas turbine engine in accordance with the present disclosure with portions broken away suggesting that the gas turbine engine includes rotating components, stationary components, and a plurality of sealing units located therebetween, the sealing units configured to establish a mechanical seal between pairs of rotating and stationary components so that various environments within the gas turbine engine remain separated.

For the purposes of promoting an understanding of the principles of the disclosure, reference will now be made to a number of illustrative embodiments illustrated in the drawings and specific language will be used to describe the same.

Figure 2:
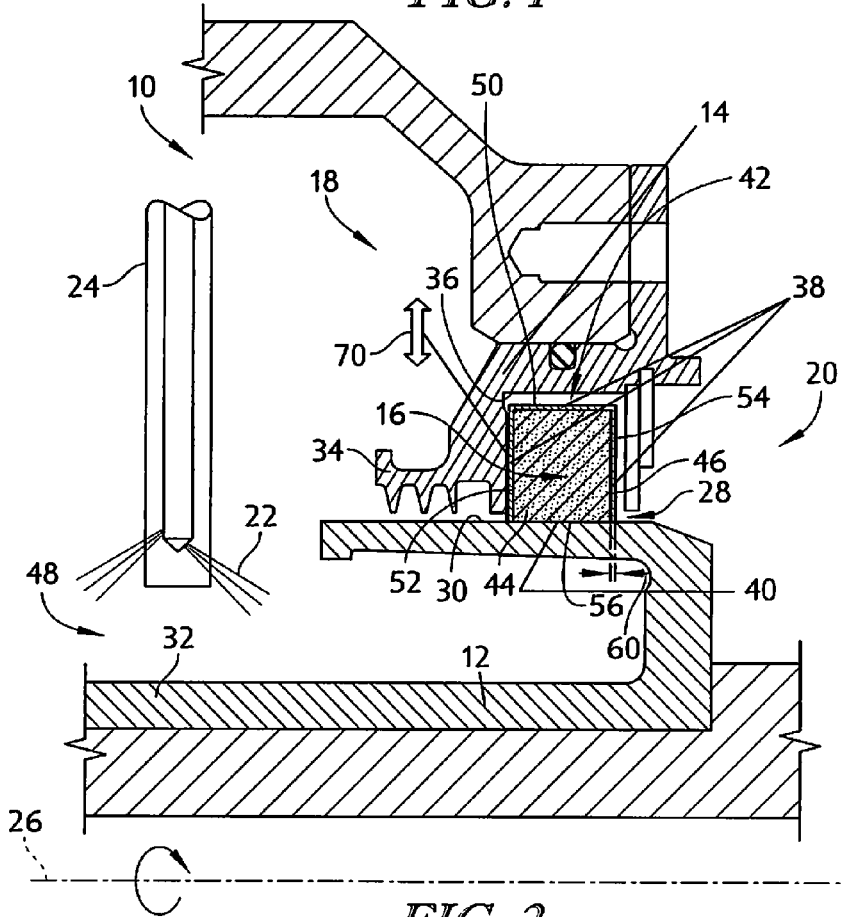
FIG. 2 is an enlarged cross-sectional view of the circled region of FIG. 1 showing a seal assembly included in the gas turbine engine, the seal assembly including an outer stationary component, an inner rotating component, and a circumferential sealing unit that is coupled to the outer stationary component and configured to engage the inner rotating component, and showing that the sealing unit includes a body and a coating, the body including coated surfaces arranged to face and engage the stationary component to form a face seal between a wet environment and a dry environment and an uncoated surface arranged to face and engage the rotating component to form a circumferential seal to separate the wet environment and the dry environment.

An illustrative seal assembly 10 is adapted for use in a gas turbine engine 68 as shown in FIG. 1. The seal assembly 10 forms a wet environment 18 on a first side of the seal assembly 10 and a dry environment 20 on a second side of the seal assembly 10 as shown in FIG. 2. In the illustrative embodiment, the wet environment 18 is formed at a fore end 82 of the gas turbine engine 68 and the dry environment 20 is formed in an aft end 84 of the gas turbine engine 68. The wet environment 18 is exposed to a liquid 22 in the form of droplets or mist during operation of the gas turbine engine 68. In the illustrative embodiment, the liquid 22 is oil for lubricating components of the gas turbine engine 68. The oil 22 is sprayed into wet environment 18 by an oil jet 24. The seal assembly 10 blocks the liquid 22 in the wet environment 18 from entering the dry environment 20 which is not exposed to liquid 22.

The seal assembly 10 includes a first component 12, a second component 14, and a sealing unit 16 as shown in FIG. 2. The first and second components 12, 14 cooperate to define the wet and dry environments 18, 20. The first component 12 is mounted relative to the second component 14 to define a gap 28 therebetween. The sealing unit 16 is arranged between the first and second components 12, 14 to block the liquid 22 in the wet environment 18 from passing through the gap 28 and entering the dry environment 20. The gap 28 allows for variations in manufacturing tolerance of the adjacent components 12, 14 and allows for expansion/contraction of the adjacent components 12, 14 that occurs during operation of the gas turbine engine 68 on account of temperature gradients throughout the gas turbine engine 68.

In one example, the first component 12 is an inner rotating component 12 and the second component 14 is an outer stationary component 14. However, the first component 12 may be an inner stationary component and the second component 14 may be an outer rotation component.

The sealing unit 16 is positioned between the outer stationary component 14 and the inner rotating component 12 to form the mechanical seal and block the liquid 22 in the wet environment 18 from traveling in a spacing, including the gap 28, between the components 12, 14 and entering the dry environment 20 as shown in FIG. 2. The sealing unit 16 includes a body 44 and a coating 46 applied to portions of body 44. The body 44 is positioned in a seal channel 42 formed in the outer stationary component 14 and engages a rotating-seal surface 30 of the inner rotating component 12 to form the mechanical seal. The coating 46 reduces the damage to the body 44 caused by engine operating conditions such as, for example, high temperatures, friction, and oxidation. As temperature increases, an oxidation rate of the body 44 also generally increases.

The coating 46 is coupled to a number of coated surfaces 38 of the body 44. The coated surfaces 38 face the outer stationary component 14. The coating is not coupled to an uncoated surface 40 of the body 44 as shown in FIG. 2. The uncoated surface 40 is the surface of body 44 that engages the rotating-seal surface 30 of the inner rotating component 12 to form the mechanical seal. In some embodiments, the uncoated surface 40 is a circumferential surface as shown, for example, in FIGS. 2 and 3. In other embodiments, the uncoated surface is an axial surface as shown, for example, in FIGS. 4 and 5.

A first embodiment of the seal assembly 10 is shown in FIG. 2. The seal assembly 10 includes the first component 12, the second component 14, and the sealing unit 16 as shown in FIG. 2. The first component is an inner rotating component 12 that rotates about a rotational axis 26 during operation of the gas turbine engine 68. The second component 14 is an outer stationary component 14 that remains in a fixed orientation relative to the rotational axis 26 during operation of the gas turbine engine 68. The inner rotating component 12 and the outer stationary component 14 cooperate to define the wet and dry environments 18, 20. The sealing unit 16 is positioned between the inner rotating component 12 and the outer stationary component 14 to form the mechanical seal and block the liquid 22 in the wet environment 18 from entering the dry environment 20.

The inner rotating component 12 is positioned in a receiver opening 48 formed in the outer stationary component 14 as shown in FIG. 2. The inner rotating component 12 extends along the rotational axis 26 and rotates about the rotational axis 26 during operation of the gas turbine engine 68. The inner rotating component 12 is annular and may be, for example, a shaft connecting a turbine component of the gas turbine engine 68 with a compressor component of the gas turbine engine 68.

The inner rotating component 12 includes a rotating body 32 and the outwardly facing rotating-seal surface 30 as shown in FIG. 2. The rotating body 32 rotates about the rotational axis 26 and transmits rotational energy in the gas turbine engine 68. The rotating-seal surface 30 is engaged by the sealing unit 16 to form the mechanical seal.

The rotating body 32 forms a portion of the wet environment 18 and a portion of the dry environment 20. The portion of the rotating body 32 forming a portion of the wet environment 18 is exposed to liquid 22 while the portion of the rotating body 32 forming the dry environment 20 is not exposed to liquid 22. The liquid 22 is blocked from traveling through the rotating body 32.

The rotating-seal surface 30 is coupled to the circumference of the rotating body 32 and rotates therewith about the rotational axis 26 as shown in FIG. 2. The rotating-seal surface 30 faces the outer stationary component 14. The rotating-seal surface 30 is engaged by the sealing unit 16 to form the mechanical seal. The rotating-seal surface 30 is generally uninterrupted.

The outer stationary component 14 cooperates with the inner rotating component 12 to define the wet and dry environments 18, 20. The outer stationary component 14 is annular and extends along the rotational axis 26 as shown in FIG. 2. The outer stationary component 14 is formed to define a receiver opening 48 sized to receive the inner rotating component 12. The outer stationary component 14 remains in a fixed orientation relative to the rotational axis 26 during operation of the gas turbine engine 68 while the inner rotating component 12 rotates about the rotational axis 26.

The outer stationary component 14 includes a stationary body 34, and a number of surfaces 36. The stationary body 34 forms a portion of the wet environment 18 and a portion of the dry environment 20. The liquid 22 is blocked from traveling through the stationary body 34. The stationary body 34 is formed to define the receiver opening 48. The number of surfaces 36 cooperate to define the seal channel 42.

The receiver opening 48 is cylindrical and formed in an inner portion of the stationary body 34 as shown in FIG. 2. The receiver opening 48 is sized to receive the inner rotating component 12. The inner rotating component 12 is positioned in the receiver opening 48 such that outer stationary component 14 is radially spaced apart from the inner rotating component 12 and the spacing at a given axial location is generally constant about the rotational axis 26. The spacing allows for variations in manufacturing tolerance of the adjacent components 12, 14 and allows for expansion/contraction of the adjacent components 12, 14 that occurs during operation of the gas turbine engine 68 on account of temperature gradients throughout the gas turbine engine 68.

The seal channel 42 is an annular opening defined by the number of surfaces 36 as shown in FIG. 2. The seal channel 42 opens radially downward into the receiver opening 48. The seal channel 42 is sized to receive the sealing unit 16. The seal channel 42 is spaced apart from and opposite the rotating-seal surface 30 of the inner rotating component 12 to form the gap 28.

The gap 28 allows for variations in manufacturing tolerance of the adjacent components 12, 14 and allows for expansion/contraction of the adjacent components 12, 14 that occurs during operation of the gas turbine engine 68 on account of temperature gradients throughout the gas turbine engine 68. The spacing between the seal channel 42 and the rotating-seal surface 30 at a given axial location is generally constant about the rotational axis 26. The liquid 22 in the wet environment 18 is urged to enter the spacing between the inner rotating component 12 and the outer stationary component 14, including gap 28, to enter the dry environment 20. However, the sealing unit 16 is positioned between the outer stationary component 14 and the inner rotating component 12 to form a circumferential seal with the rotating component 12 and a face seal with the stationary component 14 to block the liquid 22 in the wet environment 18 from traveling in the spacing between the components 12, 14 and entering the dry environment 20 as shown in FIG. 2.

The sealing unit 16 includes the body 44 and the coating 46. The body 44 is positioned in the seal channel 42 and engages the rotating-seal surface 30 of the inner rotating component 12 to form the mechanical seal. The coating 46 reduces the damage to the body 44 caused by engine operating conditions such as, for example, high temperatures, friction, and oxidation.

The body 44 is an annular ring having a generally rectangular cross section as shown in FIG. 2. The body 44 includes an uncoated surface 40 and a number of coated surfaces 38 including an outer-circumferential surface 50, a fore-axial surface 52, and an aft-axial surface 54. The uncoated surface 40 is an inner-circumferential surface 56 spaced apart from and opposite the outer-circumferential surface 50.

The body 44 is positioned in the seal channel 42 such that the outer-circumferential surface 50, the fore-axial surface 52, and the aft-axial surface 54 face the number of surfaces 36 of the outer stationary component 14 and the uncoated surface 40 faces and engages the rotating-seal surface 30 of the inner rotating component 12 to form a circumferential seal. The fore-axial surface 52 faces and engages one of the surfaces 36 of the stationary component 14 to form a face seal. In some embodiments, the body 44 is monolithically formed from carbon. In some embodiments, the body 44 is formed from graphitic carbon.

The coating 46 is coupled to a number of surfaces of the body 44 to reduce damage to the body 44 caused by engine operating conditions as shown in FIG. 2. The coating 46 is coupled to the coated surfaces 38 of the body 44. The coating 46 is not coupled to at least the uncoated surface 40 of the body 44 that engages the inner rotating component 12. The coating 46 reduces damage to the body 44 caused by engine operating conditions such as, for example, frictional wear, high-temperatures, and oxidation. The sealing unit 16 has a relatively longer life expectancy as compared to sealing units with no coating 46.

The coating 46 has a coating thickness 60 and the coating thickness 60 is generally constant as shown in FIG. 2. In some embodiments, the coating thickness 60 is less than or equal to 0.001 inches. In other embodiments, the coating thickness 60 is greater than 0.001 inches. In some embodiments, the coating does not penetrate into the body 44. In other embodiments, the coating may penetrate into the body 44. In some embodiments, the coating 46 is a ceramic material, however, any suitable oxidation, abrasion, and temperature resistant material may be used. In some embodiments, the coating 46 is silicon carbide (SiC). In some embodiments, the coating 46 is coupled to the body 44 using chemical vapor deposition, however, any suitable process for depositing a coating may be used. In other embodiments, the coating 46 may be coupled to the body 44 using any other suitable process.

In some embodiments, the body 44 and the coating 46 of the sealing unit 16 have dimensions such that at least one coated surface 38 of the sealing unit 16 is spaced apart from one of the surfaces 36 of the stationary component 14 in the seal channel 42. The at least one coated surface 38 is spaced apart from one of the number of surfaces 36 to allow the sealing unit 16 to move relative to the stationary component 14. As such, the sealing unit 16 may move relative to the stationary component 14 radially, as suggested by arrow 70 in FIG. 2, or axially. The sealing unit 16 may move relative to the outer stationary component 14 to compensate for imperfections in the inner rotating component 12, for example.

The sealing unit 16 is positioned in the seal channel 42 as shown in FIG. 2. The coated surfaces 38 face the number of surfaces 36 of the outer stationary component 14. The uncoated surface 40 of the sealing unit 16 extends out of the seal channel 42 and engages the rotating-seal surface 30 of the inner rotating component 12 to form the mechanical seal. The mechanical seal blocks the liquid 22 in the wet environment 18 from traveling through the spacing, including the gap 28, between the components 12, 14 and entering the dry environment 20. In some embodiments, seal assembly 10 is utilized where the inner rotating component 12 turns at high speed. For example, seal assembly 10 may be utilized when sealing against the main shaft of the gas turbine engine 68.

A method of forming the sealing unit 16 includes forming the body 44 from graphitic carbon, depositing the coating 46 made of silicon carbide on the body 44, and removing a portion of the coating 46 from the body 44. In some embodiments, the portion of the coating 46 is removed, for example, by machining, from the uncoated surface 40 of the body 44 configured to engage the rotating-seal surface 30 of the rotating engine component 12 to form the mechanical seal.

In some embodiments, the method further includes processing at least a portion of the coating 46 to define a surface flatness and a surface thickness of the portion of the coating 46. In some embodiments, forming the body 44 from graphitic carbon includes forming a body mass from graphitic carbon and processing the body mass so the body mass is within a dimensional tolerance. In some embodiments, the body 44 is within the dimensional tolerance after the coating 46 is deposited on the body 44.

Figure 3:
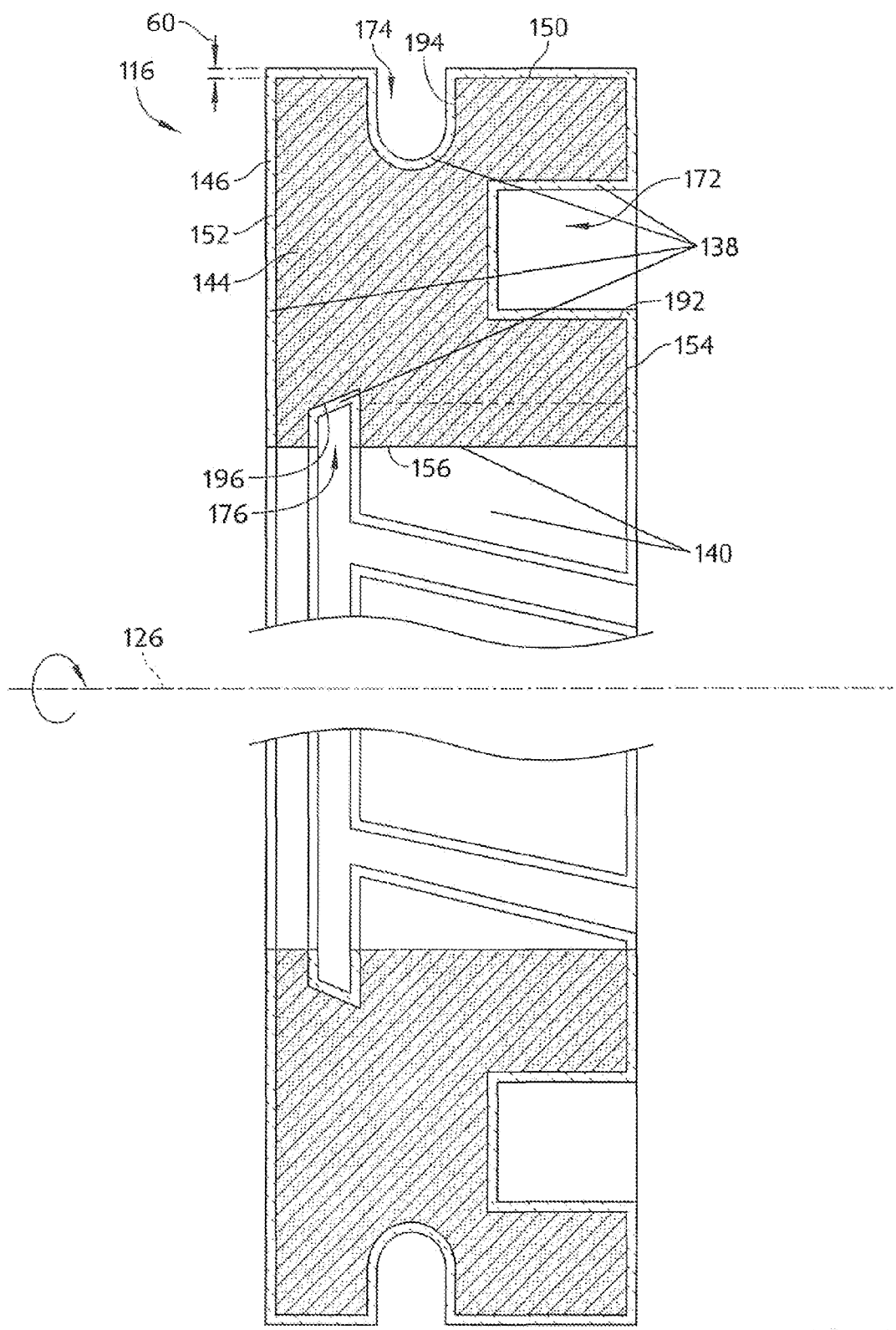
FIG. 3 is a cross-sectional view of another embodiment of a circumferential sealing unit which includes a fore-axial surface that is uninterrupted and completely coated, an aft-axial surface facing opposite the fore-axial surface, an outer-circumferential surface, and an inner circumferential surface, the aft-axial surface, the outer-circumferential surface, and the inner-circumferential surface are each formed to include an aperture opening into a space formed in the body, the spaces defined by associated inner surfaces of the body, and the coating is applied to the inner surfaces.

Another embodiment of a sealing unit 116 for use in a seal assembly in accordance with the present disclosure is shown in FIG. 3. The sealing unit 116 includes a body 144 and a coating 146. The body 144 is configured to be positioned in a seal-channel of a second component included in a seal assembly and engage a seal surface of a first component included in the seal assembly to form a circumferential seal. The coating 146 is configured to reduce the damage to the body 144 caused by engine operating conditions such as, for example, high temperatures, friction, and oxidation.

The body 144 is an annular ring having a rectangular-shape cross section as shown in FIG. 3. The body 144 includes an uncoated surface 140 and a number of coated surfaces 138. The uncoated surface 140 is an inner-circumferential surface 156. The coated surfaces 138 include an outer-circumferential surface 150 spaced apart from and opposite the inner-circumferential surface 156, the fore-axial surface 152 extending between the outer and inner-circumferential surfaces 150, 156, and an aft-axial surface 154 spaced apart from and opposite the fore-axial surface 152 and extending between the outer and inner-circumferential surfaces 150, 156.

The coating 146 is coupled to a number of surfaces of the body 144 to reduce damage to the body 144 caused by engine operating conditions as shown in FIG. 3. The coating 146 is coupled to the coated surfaces 138 of the body 144. The coating 146 is not coupled to at least the uncoated surface 140 of the body 144 that is configured to engage the first component. The coating 146 is configured to reduce damage to the body 144 caused by engine operating conditions such as, for example, frictional wear, high-temperatures, and oxidation. The sealing unit 116 has a relatively longer life expectancy as compared to sealing units with no coating 146.

The body 144 is formed to include a number of apertures 172, 174, 176 as shown in FIG. 3. The aft-axial surface 154 is formed to include an aperture 172 opening into a space formed in the body 144. The space is defined by a first inner surface 192. The coating 146 is coupled to the first inner surface 192. The outer-circumferential surface 150 is formed to include an aperture 174 opening into a space formed in the body 144. The space is defined by a second inner surface 194. The coating 146 is coupled to the second inner surface 194. The inner-circumferential surface 156 is formed to include an aperture 176 opening into a space formed in the body 144. The space is defined by a third inner surface 196. The coating 146 is coupled to the third inner surface 196.

The first inner surface 192 is shaped to the contour of an axial-biasing unit which engages the first inner surface 192 and urges the sealing unit 116 axially toward the second component. In one embodiment, the sealing unit 116 is formed from a number of arc-shaped sections which cooperate to form a complete ring. The second inner surface 194 is shaped to the contour of a radial-biasing unit which engages the second inner surface 194 and urges the sealing unit 116 radially toward the first component and holds the arc-shaped sections together. In one embodiment, the third inner surface 196 provides a path for air to circulate thereby cooling the sealing unit 116 and evening the pressure distribution axially along the inner-circumferential surface 156. The apertures 172, 174, 176 are formed such that the liquid 22 is blocked from traveling completely through the sealing unit 116 in an axial direction.

Figure 4:
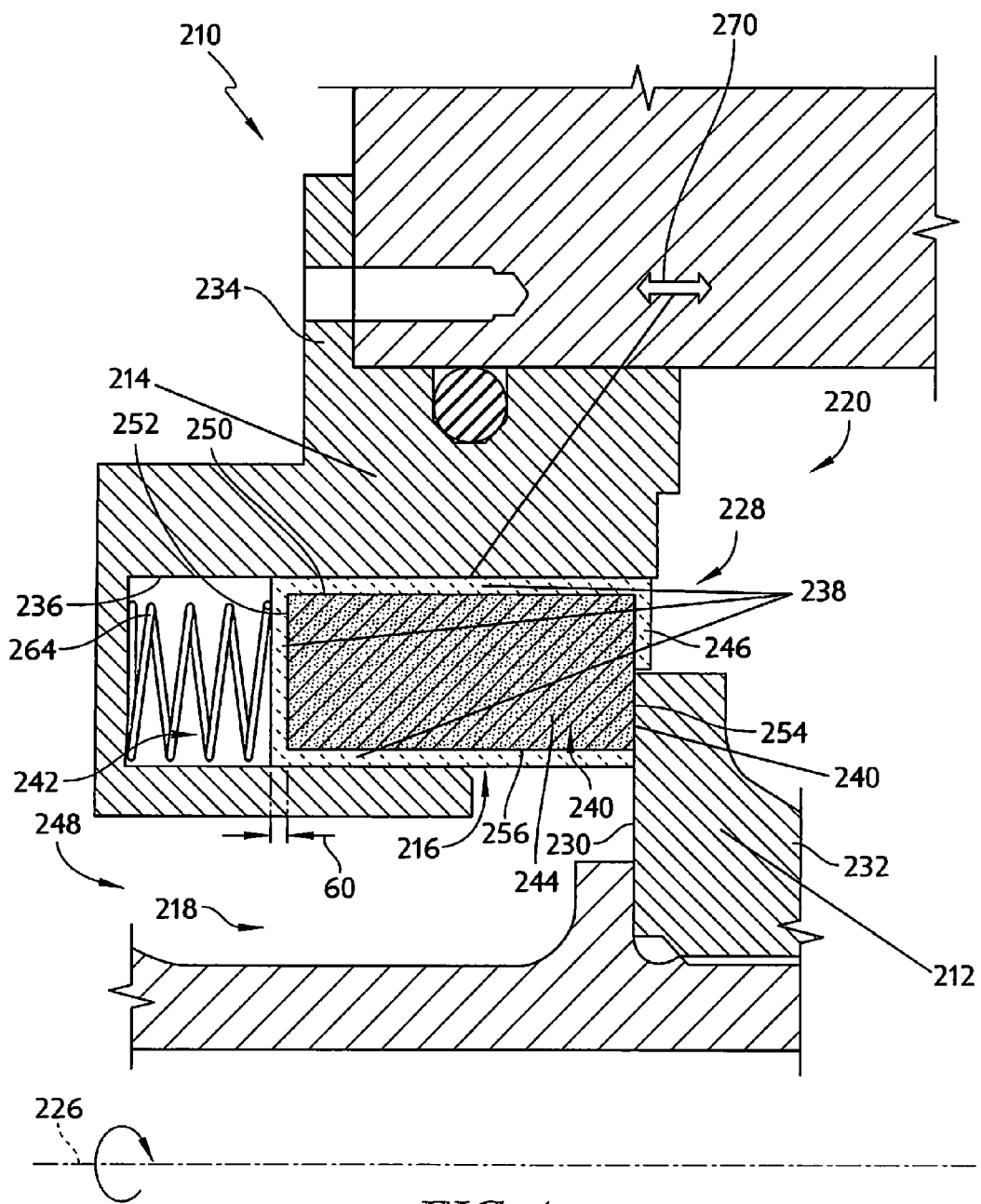
FIG. 4 is an enlarged cross-sectional view of a another embodiment of a seal assembly for use in the gas turbine engine of FIG. 1, the seal assembly including an outer stationary component, an inner rotating component, and a face sealing unit, the sealing unit is coupled to an upper stationary component and configured to engage a lower rotating component, and the face sealing unit includes a body and a coating, the boy including coated surfaces arranged to face and engage the stationary component to form a face seal between a wet environment and a dry environment and an uncoated surface arranged to face and engage the rotating component to form a face seal between the wet environment and the dry environment.

Another embodiment of a seal assembly 210 is shown in FIG. 4. The seal assembly 210 includes a first component 212, a second component 214, and a sealing unit 216. The first component 212 is an inner rotating component 212 that rotates about a rotational axis 226 during operation of the gas turbine engine 68. The second component 214 is an outer stationary component 214 that remains in a fixed orientation relative to the rotational axis 226 during operation of the gas turbine engine 68. The inner rotating component 212 and the outer stationary component 214 cooperate to define wet and dry environments 218, 220. The sealing unit 216 is positioned between the inner rotating component 212 and the outer stationary component 214 to form a face seal with the rotating component and a circumferential seal with the stationary component to block liquid 22 in the wet environment 218 from entering the dry environment 220.

The inner rotating component 212 includes a rotating body 232 and an outwardly facing rotating-seal surface 230 as shown in FIG. 4. The rotating body 232 rotates about the rotational axis 226 and transmits rotational energy in the gas turbine engine 68. The rotating-seal surface 230 is engaged by the sealing unit 216 to form the mechanical seal.

The rotating-seal surface 230 is an axial surface of the rotating body 232 and rotates therewith about the rotational axis 226 as shown in FIG. 4. The rotating-seal surface 230 faces the outer stationary component 214. The rotating-seal surface 230 is engaged by the sealing unit 216 to form the mechanical seal to block liquid 22 in the wet environment 218 from passing between the components 212, 214 and entering the dry environment 220. The rotating-seal surface 230 is generally uninterrupted.

The outer stationary component 214 includes a stationary body 234, and a number of surfaces 236. The stationary body 234 forms a portion of the wet environment 218 and a portion of the dry environment 220. The liquid 22 is blocked from traveling through the stationary body 234. The stationary body 234 is formed to define a receiver opening 248 sized to receive the inner rotating component 212. The number of surfaces 236 cooperate to define a seal channel 242 sized to receive the sealing unit 216.

The receiver opening 248 is annular and formed in an inner portion of the stationary body 234 as shown in FIG. 4. The receiver opening 248 is sized to receive the inner rotating component 212. The inner rotating component 212 is positioned in the receiver opening 248 such that outer stationary component 214 is radially spaced apart from the inner rotating component 212 and the spacing at a given axial location is generally constant about the rotational axis 226. The spacing allows for variations in manufacturing tolerance of the adjacent components 212, 214 and allows for expansion/contraction of the adjacent components 212, 214 that occurs during operation of the gas turbine engine 68 on account of temperature gradients throughout the gas turbine engine 68.

The seal channel 242 is an annular opening defined by the number of surfaces 236 as shown in FIG. 4. The seal channel 242 opens radially downward into the receiver opening 248. The seal channel 242 is sized to receive the sealing unit 216. The seal channel 242 is spaced apart from and opposite the rotating-seal surface 230 of the inner rotating component 212 to form the gap 228.

The gap 228 allows for variations in manufacturing tolerance of the adjacent components 212, 214 and allows for expansion/contraction of the adjacent components 212, 214 that occurs during operation of the gas turbine engine 68 on account of temperature gradients throughout the gas turbine engine 68. The spacing between the seal channel 242 and the rotating-seal surface 230 at a given axial location is generally constant about the rotational axis 226. The liquid 22 in the wet environment 218 is urged to enter the spacing between the inner rotating component 212 and the outer stationary component 214, including gap 228, to enter the dry environment 220. However, the sealing unit 216 is positioned between the outer stationary component 214 and the inner rotating component 212 to form an axial face seal with the rotating component and a circumferential seal with the stationary component to block the liquid 22 in the wet environment 218 from traveling in the spacing between the components 212, 214 and entering the dry environment 220 as shown in FIG. 4.

The sealing unit 216 includes a body 244 and a coating 246. The body 244 is positioned in the seal channel 242. A biasing unit 264 in the seal channel 242 biases the body 244 toward the inner rotating component such that the body 244 engages the rotating-seal surface 230 of the inner rotating component 212 to form the mechanical face seal. The coating 246 reduces the damage to the body 244 caused by engine operating conditions such as, for example, high temperatures, friction, and oxidation.

The body 244 is an annular ring having a rectangular-shape cross section as shown in FIG. 4. The body 244 includes an uncoated surface 240 and a number of coated surfaces 238 including an outer-circumferential surface 250, a fore-axial surface 252, and an inner circumferential surface 256. The uncoated surface 240 is at least a portion of an aft-axial surface 254.

The body 244 is positioned in the seal channel 242 such that the outer-circumferential surface 250 the fore-axial surface 252, and the inner-circumferential surface 256 face the number of surfaces 236 of the outer stationary component 214 and the uncoated surface 240 (of the aft-axial surface 254) faces and engages the rotating-seal surface 230 of the inner rotating component 212. In some embodiments, the body 244 is monolithically formed from carbon. In some embodiments, the body 244 is formed from graphitic carbon.

The coating 246 is coupled to the number of coated surfaces 238 of the body 244 to reduce damage to the body 244 caused by engine operating conditions as shown in FIG. 4. The coating 246 is not coupled to at least the uncoated surface 240 of the body 244 that engages the inner rotating component 212. The coating 246 reduces damage to the body 244 caused by engine operating conditions such as, for example, frictional wear, high-temperatures, and oxidation. The sealing unit 216 has a relatively longer life expectancy as compared to sealing units with no coating 246.

In some embodiments, the body 244 and the coating 246 of the sealing unit 216 have dimensions such that at least one coated surface 238 of the sealing unit 216 is spaced apart from one of the surfaces 236 of the stationary component 214 in the seal channel 242. The at least one coated surface 238 is spaced apart from one of the number of surfaces 236 to allow the sealing unit 216 to move relative to the stationary component 214. As such, the sealing unit 216 may move relative to the stationary component 214 axially, as suggested by arrow 270 in FIG. 4, or radially. The sealing unit 216 may move relative to the outer stationary component 214 to compensate for imperfections in the inner rotating component 212, for example. In some embodiments, seal assembly 210 is utilized where the inner rotating component 212 turns at a relatively lower speed than the main shaft of the gas turbine engine 68. For example, seal assembly 210 may be utilized when sealing against between sections of the transmission of the gas turbine engine 68.

Figure 5:
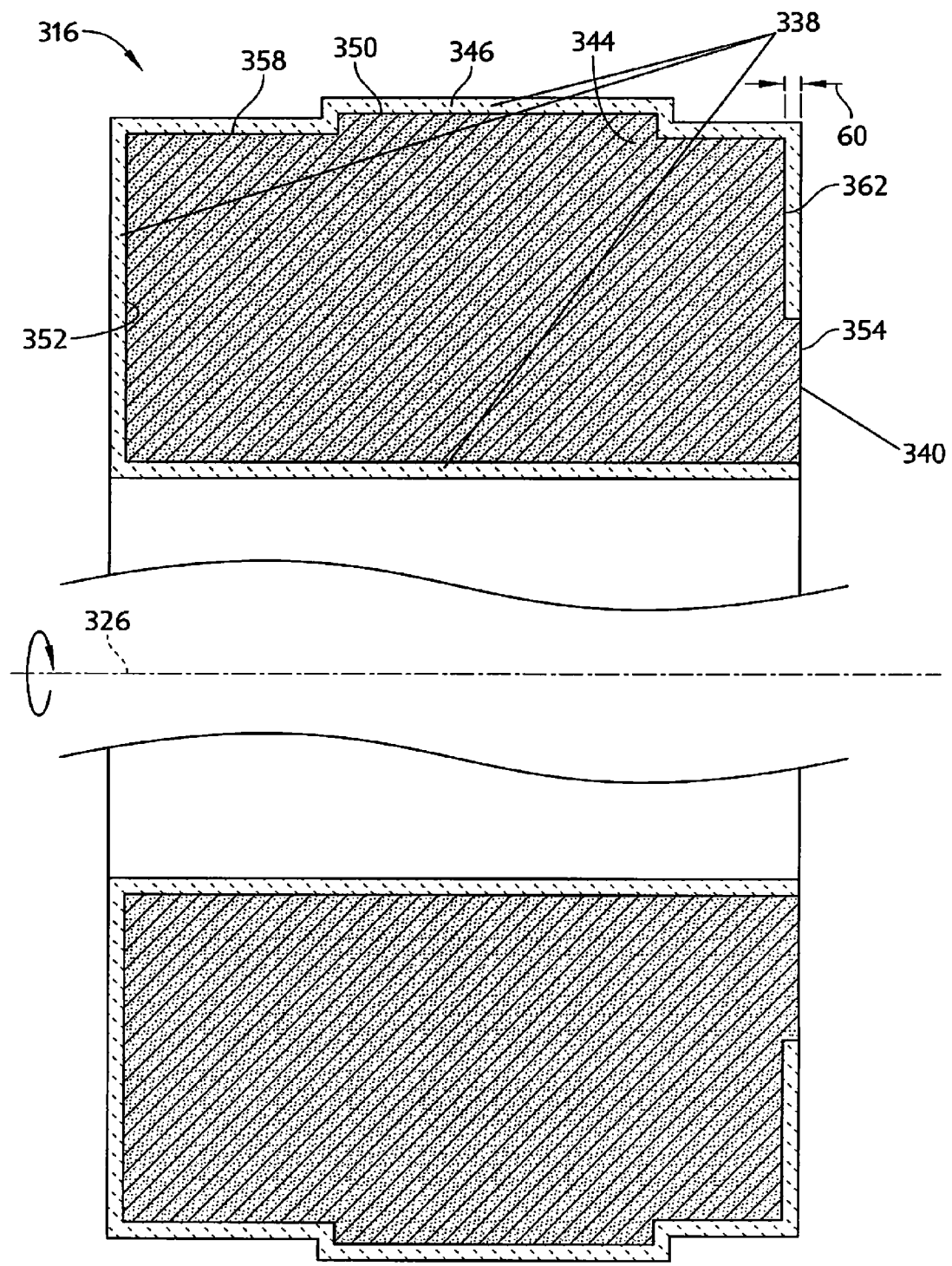
FIG. 5 is a cross-sectional view of an another embodiment of a face sealing unit which includes a fore-axial surface that is uninterrupted and coated, an aft-axial surface facing opposite the fore-axial surface and the aft-axial surface is uncoated, an inner circumferential surface that is uninterrupted and coated, an intermediate axial surface that is coated and positioned between the fore-axial surface and the aft-axial surface, and an outer circumferential surface that is coated, and an intermediate circumferential surface that is coated.

Another embodiment of a sealing unit 316 for use in a seal assembly in accordance with the present disclosure is shown in FIG. 5. The sealing unit 316 includes a body 344 and a coating 346. The body 344 is configured to be positioned in a seal-channel of a second component included in the seal assembly and engage a seal surface of a first component included in the seal assembly to form a face seal. The coating 346 is configured to reduce the damage to the body 344 caused by engine operating conditions such as, for example, high temperatures, friction, and oxidation.

The body 344 is an annular ring having a rectangular-shape cross section as shown in FIG. 5. The body 344 includes an uncoated surface 340 and a number of coated surfaces 338. The uncoated surface 340 is an aft-axial surface 354. The coated surfaces 338 include an outer-circumferential surface 350, an inner-circumferential surface 356 spaced apart from and opposite the outer-circumferential surface 350, an intermediate circumferential surface 358 positioned between the outer and inner-circumferential surfaces 350, 356, a fore-axial surface 352 extending between the intermediate and inner-circumferential surfaces 358, 356, and an intermediate-axial surface 362 positioned between the fore and aft-axial surfaces 352, 354.

The coating 346 is coupled to the number of coated surfaces 338 of the body 344 to reduce damage to the body 344 caused by engine operating conditions as shown in FIG. 5. The coating 346 is not coupled to at least the uncoated surface 340 of the body 344 that engages the first component. The coating 346 reduces damage to the body 344 caused by engine operating conditions such as, for example, frictional wear, high-temperatures, and oxidation. The sealing unit 316 has a relatively longer life expectancy as compared to sealing units with no coating 346.

In some embodiments, the body is coupled to the first component to move therewith relative to the second component. In this example, the coating may be applied to all surfaces of the body. The coating is applied to those surfaces which face and engage the second component. In this illustrative example, the second component may be formed from a material having a hardness sufficient to engage the coated surface of the body without undue wear. In another illustrative example, the second component may have a coating applied which has a hardness sufficient to engage the coated surface of the body without undue wear during operation of the gas turbine engine.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A seal assembly for use in a gas turbine engine comprising
   a rotating engine component configured to rotate about a rotational axis,
   a stationary engine component positioned in a fixed orientation relative to the rotational axis and spaced apart from the rotating engine component to form a gap therebetween, and
   a sealing unit positioned in the gap between the stationary engine component and the rotating engine component, the sealing unit including a body and a coating, the body including a first surface and a second surface, the coating coupled to the first surface establishes a coated first surface and at least a portion of the second surface is free from the coating to establish an uncoated portion of the second surface, and the coated first surface directly engages the stationary engine component and the uncoated portion of the second surface directly engages the rotating engine component to form a mechanical seal between the stationary engine component and the rotating engine component.

2. The seal assembly of claim 1, wherein the first surface is an outer-circumferential surface, the second surface is an inner-circumferential surface spaced apart from the outer-circumferential surface, the body further includes a first axial surface extending between the inner-circumferential surface and the outer-circumferential surface and a second axial surface spaced apart from the first axial surface and extending between the inner-circumferential surface and the outer-circumferential surface, and at least a portion of the inner-circumferential surface of the sealing unit is free from the coating and engages the rotating engine component to form a circumferential seal.

3. The seal assembly of claim 2, wherein the first axial surface of the sealing unit engages with a surface of the stationary engine component to form a face seal.

4. The seal assembly of claim 2, wherein the second axial surface is formed to include an aperture opening into a space formed in the body, the space is defined by a first inner surface, and the coating is applied to the first inner surface.

5. The seal assembly of claim 4, wherein the outer-circumferential surface is formed to include an aperture opening into a space formed in the body, the space is defined by a second inner surface, and the coating is coupled to the second inner surface.

6. The seal assembly of claim 5, wherein the inner-circumferential surface is formed to include an aperture opening into a space formed in the body, the space is defined by a third inner surface, and the coating is coupled to the third inner surface.

7. The seal assembly of claim 2, wherein the outer-circumferential surface is formed to include an aperture opening into a space formed in the body, the space is defined by a second inner surface, and the coating is coupled to the second inner surface.

8. The seal assembly of claim 2, wherein the inner-circumferential surface is formed to include an aperture opening into a space formed in the body, the space is defined by a third inner surface, and the coating is coupled to the third inner surface.

9. The seal assembly of claim 1, wherein the first surface is a first axial surface, the second surface is a second axial surface spaced apart from the first axial surface, the body further includes an outer-circumferential surface extending between the first and second axial surfaces, an inner-circumferential surface extending between the first and second axial surfaces, and at least a portion of the second axial surface of the sealing unit is free from the coating and engages the rotating engine component to form a face seal.

10. The seal assembly of claim 9, wherein the sealing unit further includes a third axial surface positioned to lie between the first axial surface and the second axial surface and an intermediate-circumferential surface is positioned between the inner-circumferential surface and the outer-circumferential surface and extends between the second axial surface and the third axial surface, the outer-circumferential surface extends between the first axial surface and the third axial surface, the second axial surface is uncoated and engages the rotating engine component, and the coating is applied to the third axial surface, and the intermediate-circumferential surface.

11. The seal assembly of claim 9, wherein the sealing unit further includes an intermediate-circumferential surface positioned between the inner-circumferential surface and the outer-circumferential surface, a third axial surface positioned between the first axial surface and the second axial radially surface extending between the intermediate-circumferential surface and the outer-circumferential surface, and a fourth axial surface positioned between the first axial surface and the third axial surface radially extending between the intermediate-circumferential surface and the outer-circumferential surface, and the coating is coupled to the third axial surface, the fourth axial surface, and the intermediate-circumferential surface.

12. The seal assembly of claim 11, wherein the outer-circumferential surface engages with a surface of the stationary engine component to form a circumferential seal.

13. The seal assembly of claim 1, wherein the coating is less than or equal to about 0.001 inches in thickness.

14. The seal assembly of claim 1, wherein the coating is formed from an oxidation resistant material.

15. The seal assembly of claim 14, wherein the coating is formed from a ceramic material.

16. The seal assembly of claim 15, wherein the coating is formed from silicon carbide (SiC).

17. The seal assembly of claim 1, wherein the coating is applied by chemical vapor deposition.

18. The seal assembly of claim 1, wherein the body is formed from carbon.

19. The seal assembly of claim 18, wherein the body is formed from graphitic carbon.

20. The seal assembly of claim 19, wherein the coating does not penetrate into the body.

* * * * *